United States Patent [19]

Rylands

[11] 3,710,503

[45] Jan. 16, 1973

[54] PLAYTHING

[75] Inventor: Patrick Rylands, London, England

[73] Assignee: Rosedale Industries Limited, London, England

[22] Filed: Jan. 26, 1972

[21] Appl. No.: 220,822

[30] Foreign Application Priority Data

Feb. 1, 1971    Great Britain......................3,630/71

[52] U.S. Cl. ..................................................46/1 R
[51] Int. Cl. .............................................A63h 33/00
[58] Field of Search........46/174, 175, 179, 191, 193, 46/1; 272/8; 273/106 B

[56] References Cited

UNITED STATES PATENTS 1,404,132    1/1922    Manes..............................273/106 B Primary Examiner—Louis G. Mancene
Assistant Examiner—D. L. Weinhold
Attorney—Peter H. Smolka

[57] ABSTRACT

The specification discloses a plaything consisting of a flat plate with an aperture therein and flange means on both sides of the plate disposed in spaced relationship with such aperture, and a pair of joined members disposed on and slidably engaging the opposite sides of said plate, such members being joined together by an element passing through and of smaller dimension than the aperture in the plate, the arrangement being such that the two joined members are free to move together in relation to the plate without any part of the aperture in the latter becoming exposed.

3 Claims, 3 Drawing Figures

PATENTED JAN 16 1973

3,710,503

PLAYTHING

BACKGROUND OF THE INVENTION

This invention relates to playthings and has for its object the provision of a plaything which is especially attractive to a baby or young child.

SUMMARY AND DESCRIPTION OF INVENTION

According to this invention there is provided a plaything consisting of a flat plate with an aperture therein and flange means on both sides of the plate disposed in spaced relationship with such aperture, and a pair of joined members disposed on and slidably engaging the opposite sides of said plate, such members being joined together by an element passing through and of smaller dimension than the aperture in the plate, the arrangement being such that the two joined members are free to move together in relation to the plate without any part of the aperture in the latter becoming exposed. Thus the pair of joined members give the impression of one member which in some way moves through a solid plate.

Conveniently the plate and the aperture therein are circular, and the plate has around the periphery thereof an enlargement which is of circular shape in cross section, this enlargement providing projecting flanges around and on both sides of the edge of the plate. The pair of joined members may, in this case, be part spherical so that together they appear to be part of a single spherical member.

A plaything in accordance with one embodiment of this invention will now be described with reference to the accompanying drawings.

DESCRIPTION OF SHOWN EMBODIMENTS

Figure 1:
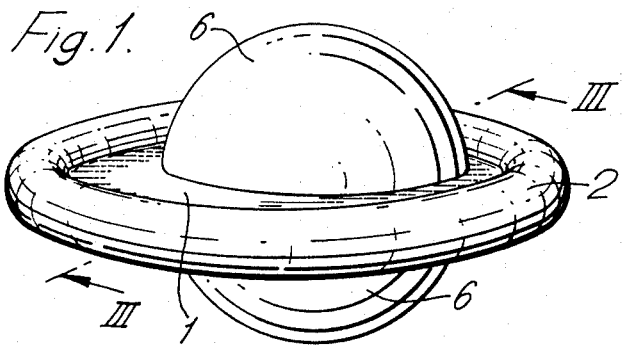
FIG. 1 is a general perspective view of the plaything.
Figure 2:
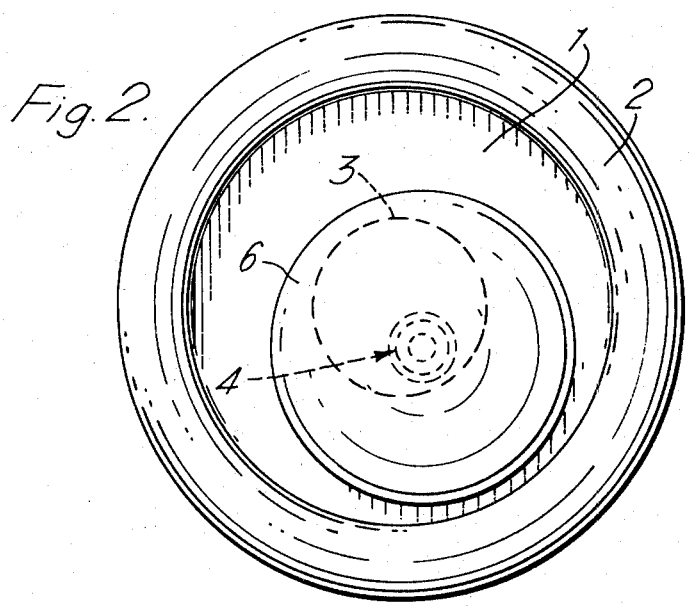
FIG. 2 is a plan view thereof.
Figure 3:
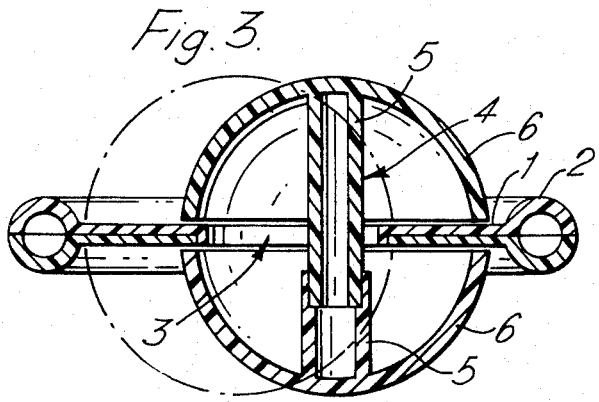
FIG. 3 is a section on the line III—III in FIG. 1.

The plaything shown in the drawings consists of a circular plate 1 with an enlargement 2 around the periphery thereof, this enlargement being of circular shape in cross section and projecting equally to both side surfaces of the plate 1 thereby providing projecting flanges around the periphery of the plate on both sides thereof.

Formed in the center of the plate 1 is a circular aperture 3. Extending through this aperture is a short rod 4 or the like which is of smaller diameter than the aperture 3, the rod 4 being formed by two interengaged spigots 5 formed integrally with two part spherical members 6 the largest diameter of each of which is greater than the diameter of the aperture 3 in the plate 1. The spacing of the two part spherical members 6 is such that they virtually touch and slide over the opposite side surfaces of the plate 1. Together the two members are arranged so as to form parts of what is in effect one spherical member.

The distance between the aperture 3 in the plate 1 and the enlargement 2 forming the side edge flanges thereon, the diameter of the rod 4 or the like, and the largest diameter of the two part spherical members 6 are so chosen that the part spherical members can move in any direction into engagement with the side edge flanges of the plate without ever exposing any part of the aperture 3.

Thus if the plaything is tilted, shaken about or otherwise moved it will seen that a solid spherical body is in some way moving about in a solid plate.

I claim:
1. A plaything comprising a flat plate with an aperture therein and flange means on both sides of the plate disposed in spaced relationship with such aperture, and a pair of joined members disposed on and slidably engaging the opposite sides of said plate, such members being joined together by an element passing through and of smaller dimension than the aperture in the plate, each of said joined members being of sufficiently greater dimension than the aperture in the plate such that the two joined members are free to move together in relation to the plate without any part of the aperture in the latter becoming exposed.

2. A plaything as claimed in claim 1 wherein the plate and the aperture therein are circular, and the plate has around the periphery thereof an enlargement which is of circular shape in cross section, this enlargement providing projecting flanges around and on both sides of the edge of the plate.

3. A plaything as claimed in claim 2 wherein the pair of joined members are part spherical so that together they appear to be part of a single spherical member.

* * * * *